United States Patent [19]
Loginov

[11] Patent Number: 5,880,746
[45] Date of Patent: Mar. 9, 1999

[54] APPARATUS FOR FORMING A SUM IN A SIGNAL PROCESSING SYSTEM

[75] Inventor: Vadim Loginov, Moscow, Russian Federation

[73] Assignee: Sun Microsystems, Inc., Palo Alto, Calif.

[21] Appl. No.: 880,104

[22] Filed: Jun. 20, 1997

[51] Int. Cl.[6] .................................................. G06F 13/00
[52] U.S. Cl. .................... 345/524; 364/736.01; 395/562; 395/564; 395/565
[58] Field of Search ................................. 345/523–525; 364/736.01, 748.01; 395/562–565

[56] References Cited

U.S. PATENT DOCUMENTS

| | | | |
|---|---|---|---|
| 5,268,995 | 12/1993 | Diefendorff et al. | 345/421 |
| 5,533,185 | 7/1996 | Lentz et al. | 345/524 |
| 5,767,867 | 6/1998 | Hu | 345/524 |

OTHER PUBLICATIONS

Sun Microsystems "The UtraSPARC Processor... Technology White Paper; The UltraSPARC Architecture" Nov. 14, 1995.

*Primary Examiner*—Kee M. Tung
*Attorney, Agent, or Firm*—D'Alessandro & Ritchie

[57] ABSTRACT

According to a presently preferred embodiment of the present invention, a method for processing a incoming signal comprising the steps of selecting a first set of bits of digital information from a first signal, selecting a second set of bits of digital information from a second signal, reading the first set of bits of signal information into a first contiguous memory space to form a first word, and then reading the second set of bits of signal information into a second contiguous memory space to forming a second word, performing a first EXCLUSIVE OR operation on the first word with the second word, performing a first logical AND operation on the first word with a mask, performing a second logical AND operation of said second word with a mask, performing a first addition operation of the results of the first logical AND operation with the results of the second logical AND operation, performing a third logical AND operation on the results of the first EXCLUSIVE OR operation with a mask word, and then performing a second EXCLUSIVE OR operation of the results of the third logical AND operation with the results of the first addition operation.

1 Claim, 3 Drawing Sheets

APPARATUS FOR FORMING A SUM IN A SIGNAL PROCESSING SYSTEM

BACKGROUND OF THE INVENTION

1. Field of the Invention

The present invention relates to an apparatus and method useable for the real-time processing of video signals and other signals requiring digital processing.

2. The Background Art

With the rise in demand for increasingly complex electronic devices, such as computers performing video signal processing functions, it is often required that large quantities of data be manipulated by common operations, to lighten or darken an image, merge two images together, etc.

Signals requiring manipulation often contain a great deal of information, such as when an NTSC signal is being operated upon to produce various effects. A digital NTSC signal produces approximately 10.4 million pixels per second, and each pixel contains information for three colors, red, green, and blue. Thus, a digital NTSC signal results in more than 31 million pieces of digital data per second.

A typical computer CPU speed of 200 Mhz having to process more than 30 million pieces of digital video data per second, results in less than seven CPU clock cycles available each second for processing each color component for each pixel. In order to provide a smooth transition during real-time video processing, it is necessary that processing of each frame be completed prior to its display. Thus, speed of processing is extremely important in real-time signal processing applications.

In modern day computers, memory operations are the slowest operations performed, with the typical read or store operation requiring a full clock cycle in which to be executed. With the number of operations being performed on a real time video signal as seen above, it is critical that even the most simple operations be performed in the most efficient manner. However, signal processing systems, though useful for their intended purposes, often do not optimize processing functions so that memory use is minimized. It would therefore be beneficial to provide a signal processing system and methods for its use which perform specialized processing functions while minimizing the number of transfers into and out of memory.

In addition to limiting the number of memory operations performed, it is often desirable to reduce the number of discrete operations performed in a given period of time. Typically, repetitive operations are performed sequentially rather than in parallel. Performing signal processing operations on many bytes of simultaneously often reduces the amount of time required to perform those signal processing operations on the entire set of data as compared to the amount of time which might be required to perform those same operations at same operation when performed sequentially. It would therefore be beneficial to provide an apparatus and method which processes several bytes of data simultaneously.

In video processing operations, such as when decoding a video signal using the MPEG-II compression standard, or when scaling or rotating images, it is necessary to combine the incoming signal being processed with other internally generated signal data in order to achieve a given result. The present invention is only concerned with the combination of two signals when the overflow that may result is ignored, such as when adding the angular data corresponding to two pixel vectors.

In the prior art, 8-bit signal information from the incoming signal, such as pixel information, was added to other 8-bit information, one 8-bit byte at a time. This method, while use for its intended purposes, utilizes the processor inefficiently, and fails to optimize memory operations.

In the discussion that follows, memory refers to any memory used by a Central Processing Unit to perform operations. The data being manipulated is typically real-time graphical image data, but may be any type of signal data requiring similar processing.

To illustrate the method of the prior art, a first set of four 8-bit bytes of signal data such as pixel information will be combined with a different set of four 8-bit bytes to produce a composite output.

FIG. 1 is a flow chart of the prior art method of combining video signal data represented by two groups of four 8-bit bytes each.

Referring to FIG. 1, at step 10 a data byte from the first group of video image data is loaded into memory. At step 12, a data byte from the second group of data is loaded into memory. Step 14 then adds the data byte from the first group to the data byte from the second group, ignoring any overflow condition. The method proceeds at step 16 when the processor causes the result of step 16 to be written into memory. The method continues at step 18 where it is determined if all four data bytes in each group have been combined. If not, the method proceeds again with step 10. If yes, the method ends.

In order to combine the first two signals, one memory operation was required for each data byte in both original signals, for a total of eight load operations. A total of four addition operations were required to combine the signals, and a total of 4 store operations were required to store the results in memory. Since each memory operation takes approximately one clock cycle to complete, the entire method of combining two signals using the prior art method requires a minimum of 16 operations being performed in no less than twelve clock cycles.

OBJECTS AND ADVANTAGES OF THE INVENTION

An object and advantage of the present invention is to provide a signal processing apparatus and methods for its use which perform specialized processing functions while optimizing the use of memory operations.

A second object and advantage of the present invention is to provide an apparatus and method which processes several bytes of data simultaneously, operating on each byte identically.

These and many other objects and advantages of the present invention will become apparent to those of ordinary skill in the art from a consideration of the drawings and ensuing description of the invention.

SUMMARY OF THE INVENTION

According to a presently preferred embodiment of the present invention, a method for processing a incoming signal comprising the steps of selecting a first set of bits of digital information from a first signal, selecting a second set of bits of digital information from a second signal, reading the first set of bits of signal information into a first contiguous memory space to form a first word, and then reading the second set of bits of signal information into a second contiguous memory space to forming a second word, performing a first EXCLUSIVE OR operation on the first word with the second word, performing a first logical AND operation on the first word with a mask word, performing a second logical AND operation of said second word with a mask word, performing a first addition operation of the results of the first logical AND operation with the results of the second logical AND operation, performing a third logical AND operation on the results of the first EXCLUSIVE OR operation with a mask word, and then performing a second EXCLUSIVE OR operation of the results of the third logical AND operation with the results of the first addition operation.

DESCRIPTION OF A PREFERRED EMBODIMENT

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
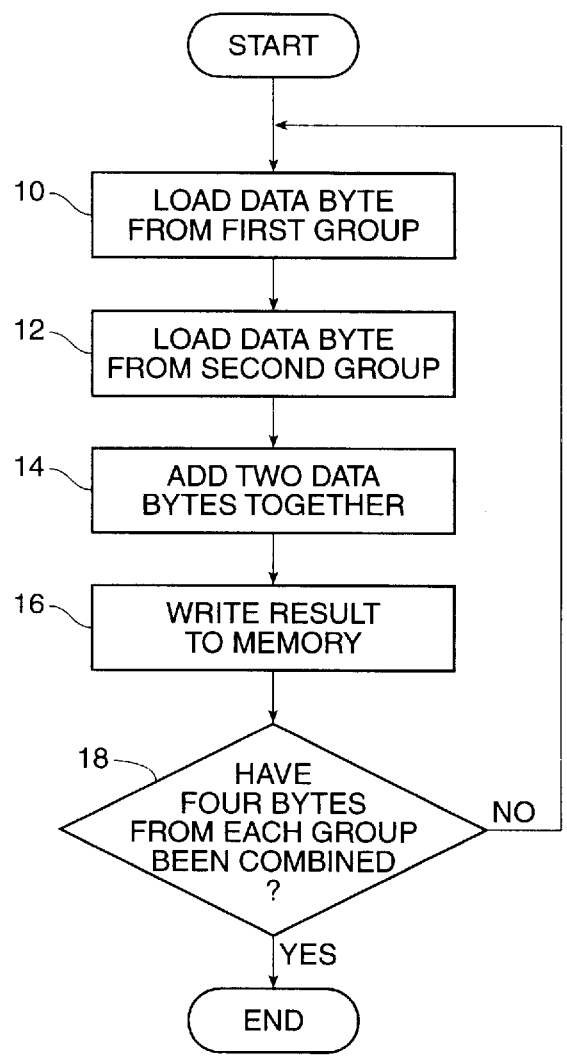
FIG. 1 is a flow chart of the prior art method of combining signal data represented by two groups of four 8-bit bytes each.
Figure 2:
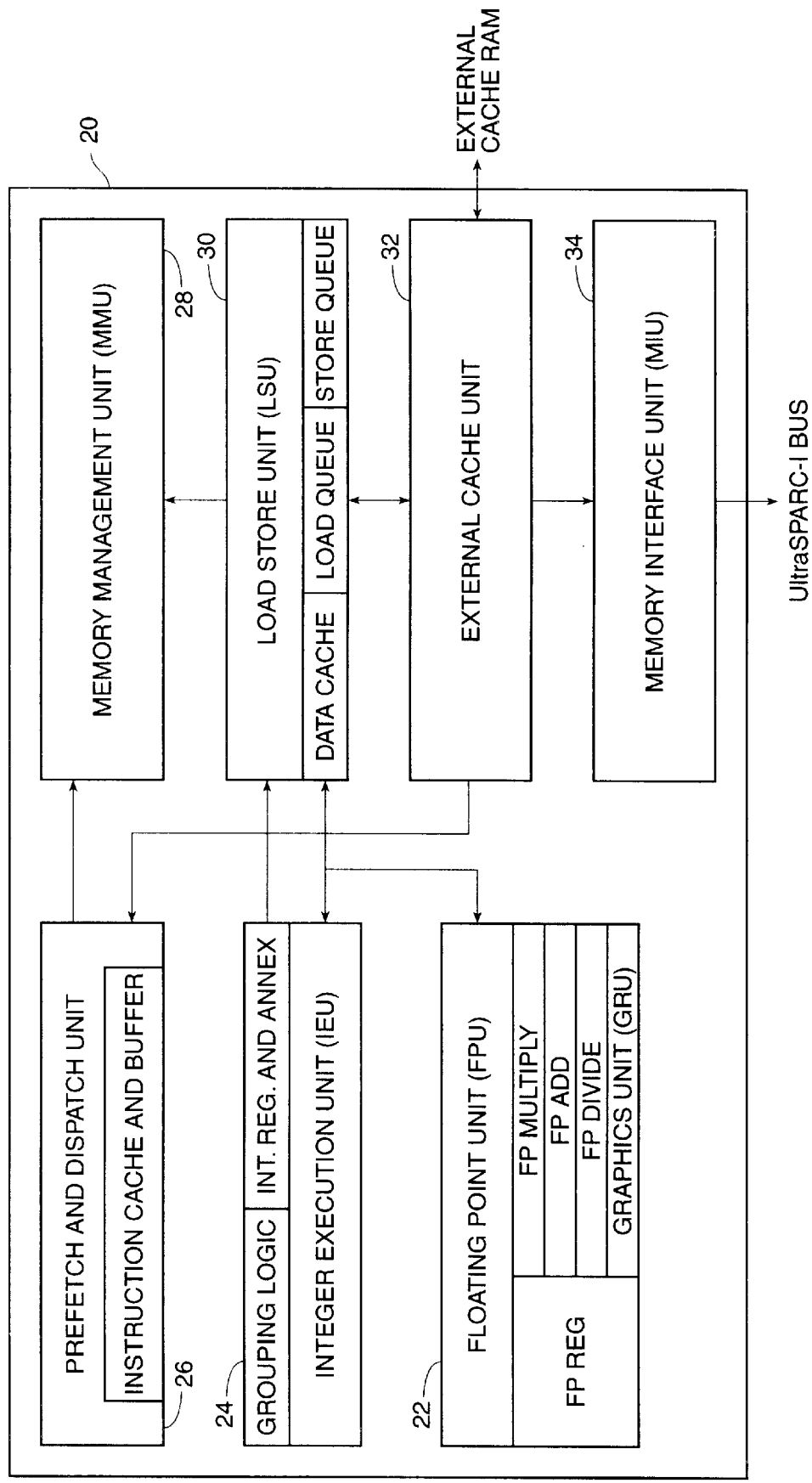
FIG. 2 is a block diagram of a representative Central Processing Unit utilizing the present invention.

FIG. 2 is a block diagram of a representative Central Processing Unit utilizing the present invention.

Referring to FIG. 2, a Central Processing Unit (CPU) 20 is presented which comprises a Floating Point Unit 22, an Integer Execution Unit 24, a Prefetch and Dispatch Unit 26, a Memory Management Unit 28, a Load Store Unit 30, an External Cache Unit 32, and a Memory Interface Unit 34.

In the processor 20 utilized in a presently preferred embodiment, these logical operations are able to be performed both in Integer Execution Unit 24 and in Floating Point Unit 22. Both of these subsections of processor 20 contain specialized instruction sets for performing individual logical operations as required.

As discussed earlier, due to the large volume of signal information required to be processed, it is necessary that processing operations be performed as quickly as possible. Memory operations performed by Memory Management Unit 28 which require a full clock cycle to complete are minimized by the present invention. As a result, the presently preferred embodiment of the present invention described herein combines two distinct groups of four 8-bit data bytes each, in approximately three clock cycles, as compared to no less than twelve clock cycles using the prior art method, resulting a throughput increase of approximately three hundred percent over the prior art.

Those of ordinary skill in the art will readily recognize that the construction of logic circuits performing bitwise EXCLUSIVE OR operations, bitwise AND operations, and addition operations are well-known in the art. These construction details known in the art are not described herein in order to avoid overcomplicating the disclosure.

Figure 3:
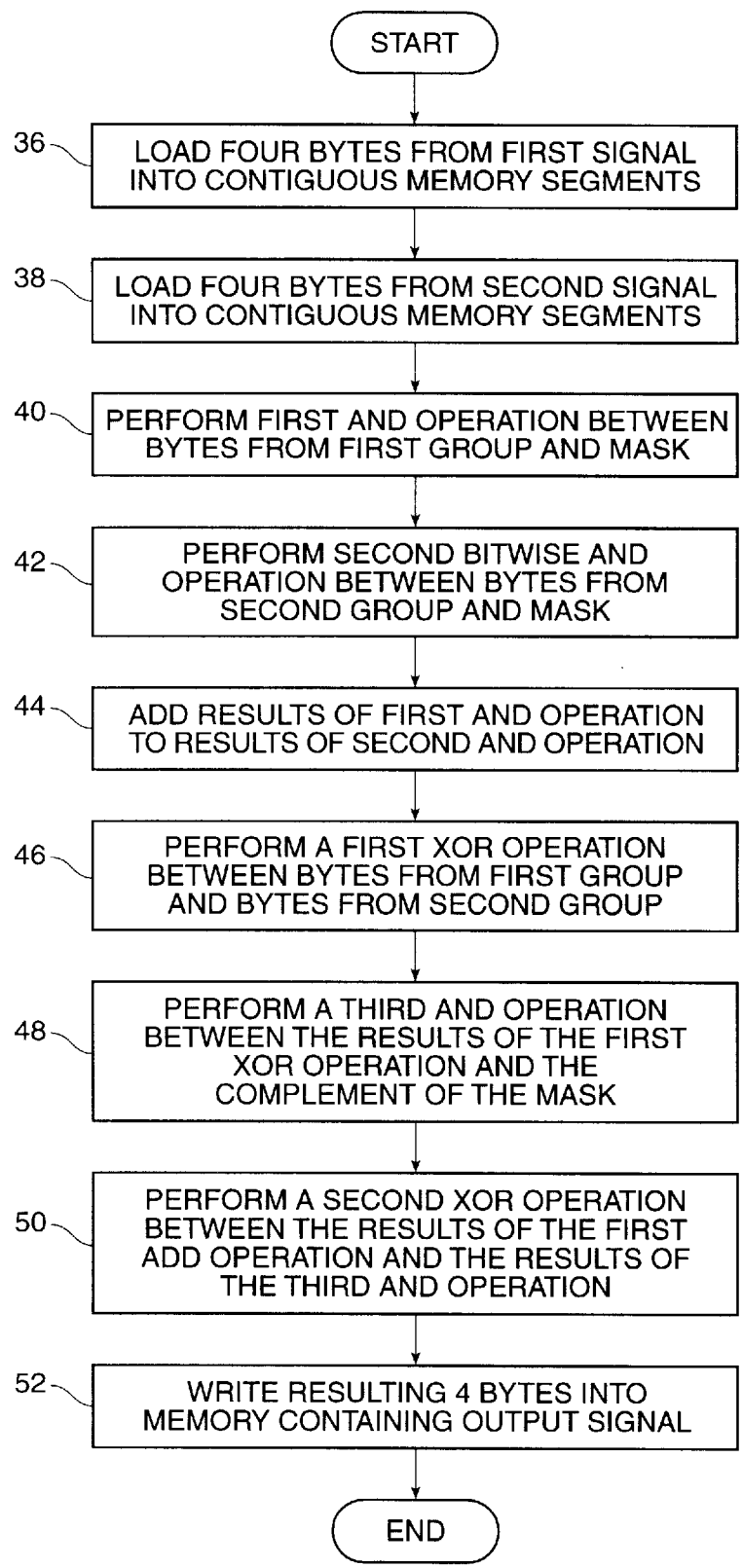
FIG. 3 is a flow chart depicting steps in a method of a presently preferred embodiment of the present invention.

FIG. 3 is a flow chart depicting steps in the method of a presently preferred embodiment of the present invention.

Referring to FIG. 3, at step 36 four data bytes each comprising an equal number of bits from the first signal are loaded into contiguous bits of memory, thus forming a first "word". In a presently preferred embodiment, the best throughput increases have been found to occur when each of the four signal data bytes comprises 8-bits, thus forming a 32 bit word at step 36.

However, as will be appreciated by those of ordinary skill in the art, the present invention may be practiced using other numbers of signal data bytes. Furthermore, although each data byte must be the same number of bits, the present invention may be readily adapted to utilize signal data bytes comprising any number of bits.

At step 38, four data bytes from the second signal is loaded into contiguous bits of memory, thus forming a second word. The four data bytes from the second signal comprise the same number of bits each, and this same number of bits is the same number of bits making up each of the four bytes within the previously described first word.

After loading the signal data into memory, at step 40 the processor performs a bitwise AND operation between the previously formed first word and a mask. The mask comprises an equal number of bits as found in the first word, and all bits in the mask are set high, e.g. to "1", except for those positions corresponding to the most significant bit (MSB) of each of the four bytes making up the first word, which are set low, e.g. set to a "0". Thus, if the four bytes making up the first word are each 8-bit bytes, as they are in a presently preferred embodiment, then the bit positions corresponding to the MSB are positions 8, 16, 24, and 32, and the mask will comprise a word represented in hexadecimal as 0x7F7F7F7F. Those of ordinary skill in the art will readily recognize that the notation used above for the mask describes a 32-bit number with the value "7F7F7F7F".

As another example for creating a mask, if the four bytes making up the first word are each five bits in length, then the MSB positions in the mask are positions 5, 10, 15, and 20.

At step 42, a second bitwise AND operation is performed between the mask word and the previously formed second word. At step 44, the results of the first bitwise AND operation performed at step 40, and the results of the second bitwise AND operation performed at step 42 are added together.

At step 46, the processor performs a first exclusive OR operation between the previously formed first word and the previously formed second word.

At step 48, a third bitwise AND operation is performed between the complement of the mask word and the results of the first exclusive OR operation performed at step 40. The complement of the mask word is formed by making changing the value of each bit in the mask to its alternate state. Since each bit must either be "on", i.e. set to 1, or "off" i.e. set to 0, each bit that was a "0" when creating the mask will now be a "1" and each bit that was a "1" when creating the mask will now be a "0". Thus, if all four signal data bytes forming the first word are 8-bit bytes, the complement of the mask will comprise a "1" in bit positions 8, 16, 24, and 32, and all other bit positions will contain a "0". In this case, as in the preferred embodiment, the complement of the mask word is represented in hexadecimal as 0x80808080. Again, this notation describes a 32-bit word with a value of "80808080".

At step 50, a second EXCLUSIVE OR operation is performed between the results of the first ADD operation performed at step 44 and the results of the third bitwise AND operation previously performed at step 48. The method then proceeds in step 52 by writing the results of step 50 into memory as the next four succeeding bytes in the output signal. Step 52 is optional, and may not be performed if the present invention is combined with other processing steps. In this case, the results of step 50 may be further used in another way, thus obviating the necessity of writing the result to memory.

Recall that the prior art method was accomplished in approximately thirteen processor clock cycles during which eight memory read operations and four memory write operations take place. Additional branching and compare operations in the prior art method add at least one more clock cycle, resulting in a total clock cycles for that method of thirteen or more.

The present invention allows the same result to be achieved in approximately three processor clock cycles. This is because only two memory read operations take place, and only one optional memory write operation takes place. Due to the construction of the architecture of the preferred embodiment, several logical operations may be performed on the same data at once, with three of four logical operations being able to be performed in the same clock cycle.

Alternative embodiments to the present invention include embedding the steps of the method of the present invention into a Field Programmable Gate Architecture (FPGA) as is well-known in the art, or using an integrated circuit design program such as VHDL to describe the method, thus hard coding the method into an application-specific integrated circuit. The skill necessary to perform such embedding and hard coding is well-known to those of ordinary skill in the art.

While illustrative embodiments and applications of this invention have been shown and described, it would be apparent to those skilled in the art that many more modifications than have been mentioned above are possible without departing from the inventive concepts set forth herein.

The invention, therefore, is not to be limited except in the spirit of the appended claims.

What is claimed is:

1. A processor comprising:

means for packing a first plurality of 8-bit integers into contiguous memory space so as to form a first 32-bit word;

means for packing a second plurality of 8-bit integers into contiguous memory space so as to form a second 32-bit word;

means for performing a first EXCLUSIVE OR operation of said first 32-bit word with said second 32-bit word;

means for performing a first logical AND operation of said first 32-bit word with a 32-bit word the value of which is represented in hexadecimal as 0x7F7F7F7F;

means for performing a second logical AND operation of said second 32-bit word with a 32-bit word the value of which is represented in hexadecimal as 0x7F7F7F7F;

means for performing a first addition operation, said operation accomplishing the adding of the results of said first logical AND operation to the results of said second logical AND operation;

means for performing a third logical AND operation of said results of said first EXCLUSIVE OR operation with a 32-bit word the value of which is represented in hexadecimal as 0x80808080;

means for performing a second EXCLUSIVE OR operation of said results of said third logical AND operation with said results of said first addition operation.

* * * * *

UNITED STATES PATENT AND TRADEMARK OFFICE
CERTIFICATE OF CORRECTION

PATENT NO. : 5,880,746
DATED : March 9, 1999
INVENTOR(S) : Vadim Loginov

It is certified that error appears in the above-identified patent and that said Letters Patent is hereby corrected as shown below:

In the Claims

In column 4, line 47, delete "making".

Signed and Sealed this

Thirtieth Day of November, 1999

Attest:

Q. TODD DICKINSON

*Attesting Officer*  Acting Commissioner of Patents and Trademarks